Sept. 22, 1953  T. B. JOCHEM  2,652,919
DRIVE SYSTEM FOR CONVEYERS
Filed Nov. 7, 1949  3 Sheets-Sheet 1
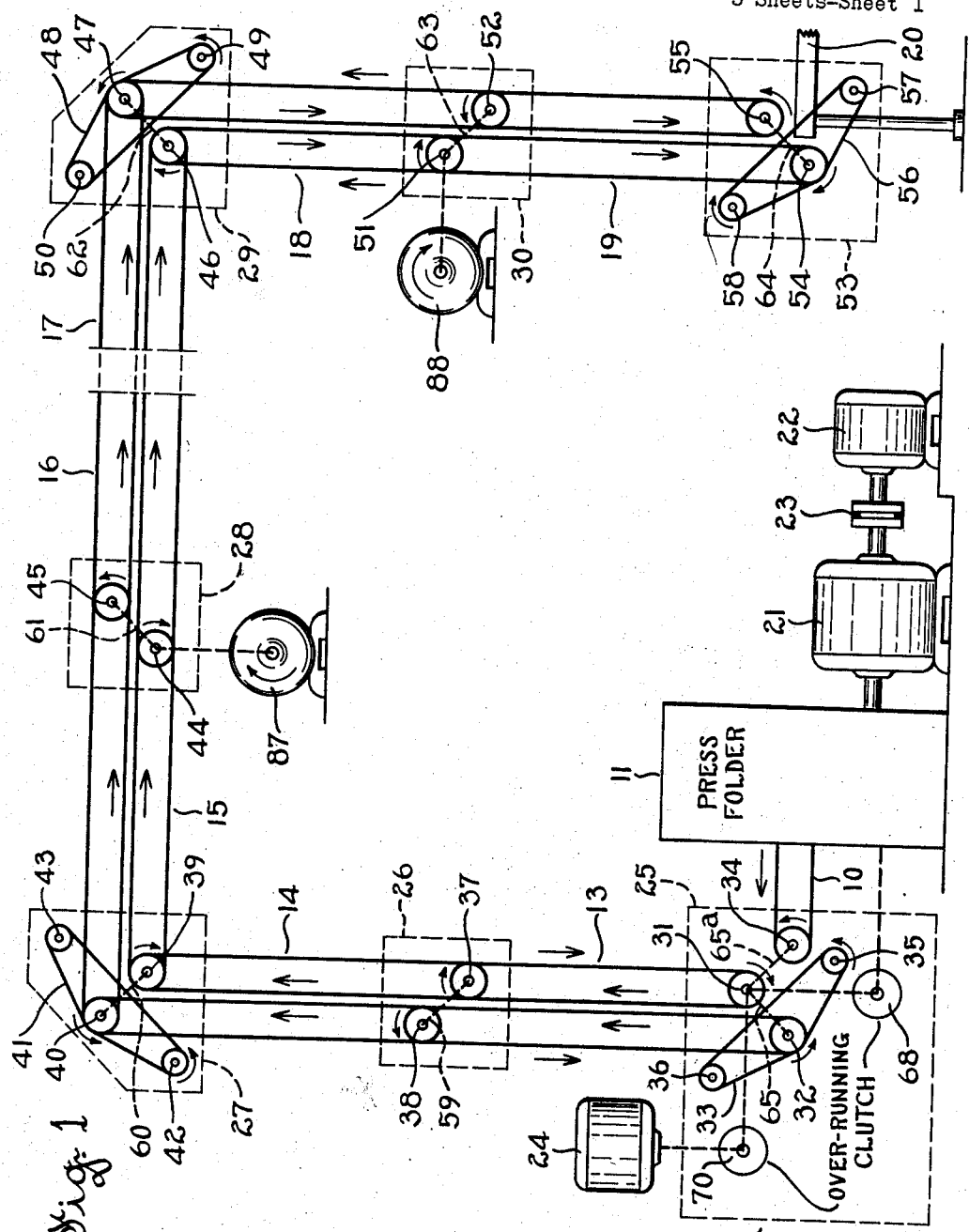

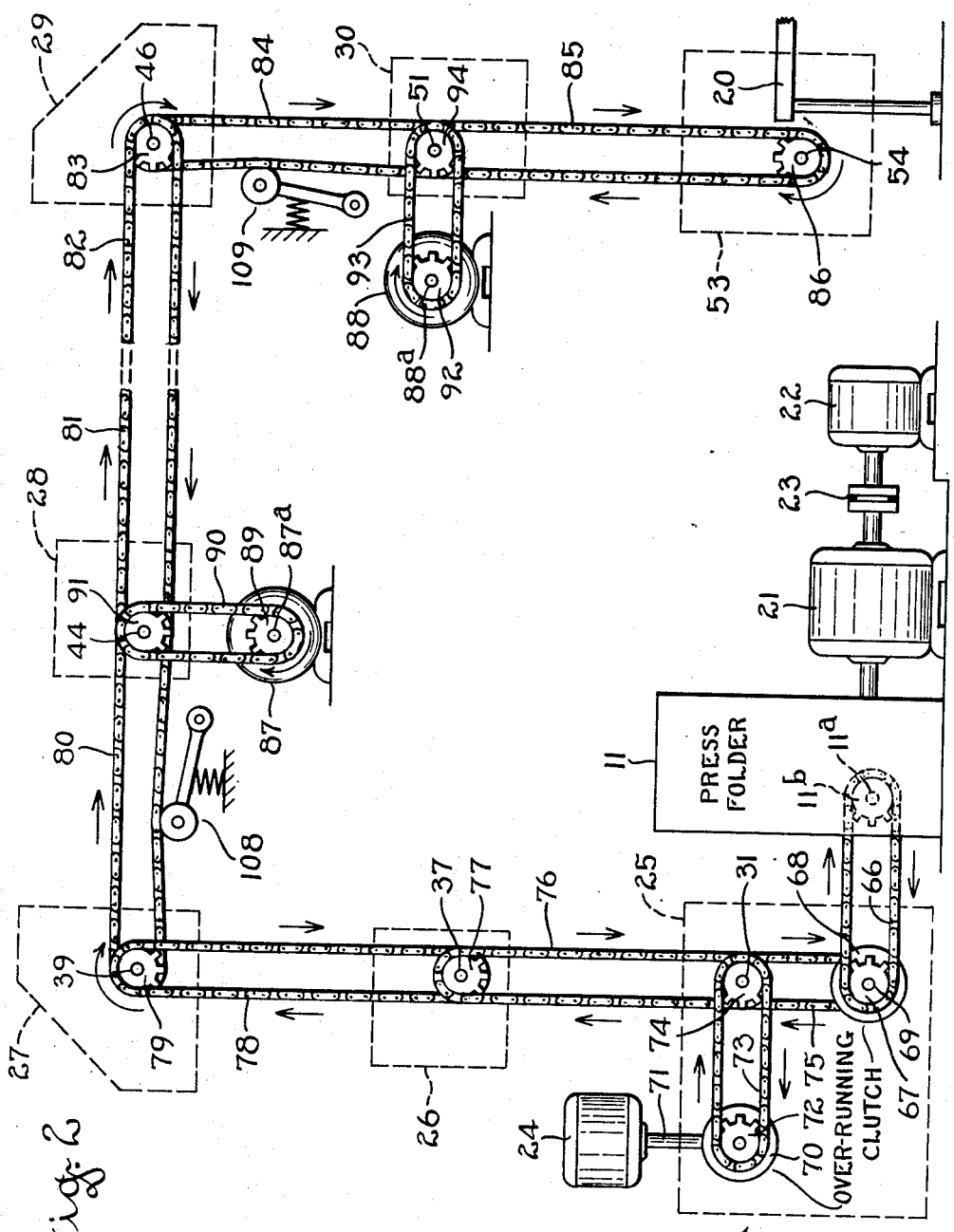

Sept. 22, 1953
T. B. JOCHEM
2,652,919
DRIVE SYSTEM FOR CONVEYERS
Filed Nov. 7, 1949
3 Sheets-Sheet 3
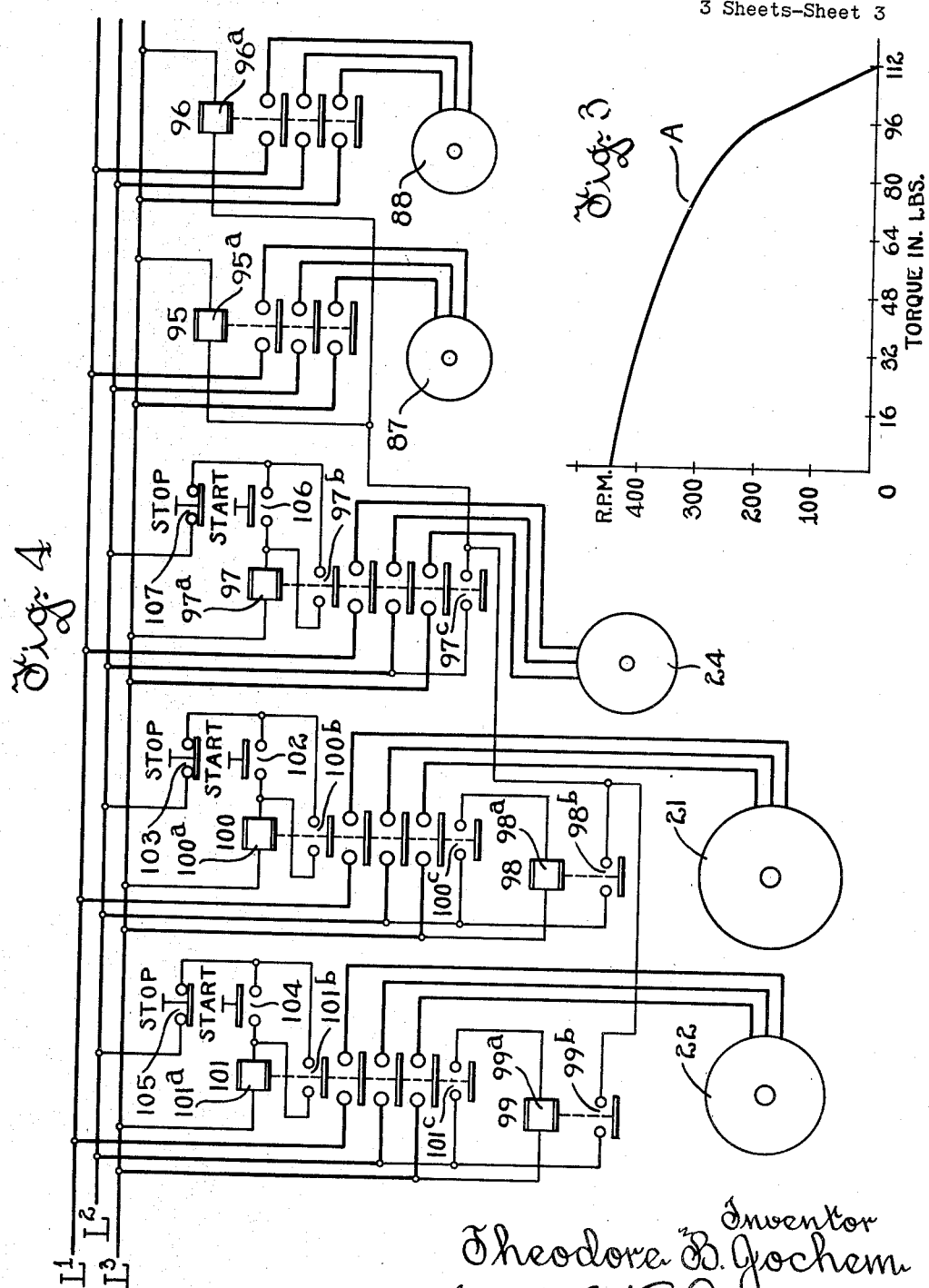

Patented Sept. 22, 1953

2,652,919

UNITED STATES PATENT OFFICE 2,652,919

DRIVE SYSTEM FOR CONVEYERS

Theodore B. Jochem, Wauwatosa, Wis., assignor to Cutler-Hammer, Inc., Milwaukee, Wis., a corporation of Delaware Application November 7, 1949, Serial No. 125,866

6 Claims. (Cl. 198—203)

This invention relates to conveyors and more particularly to a drive system for conveyors.

In newspaper printing plants, double belt conveyors are commonly installed for effecting transport of a stream of finished papers from the press folder to a mail or delivery room. During operation of the press, such conveyors are usually driven by power derived from a shaft of the press folder which in turn derives its power from the press motor or motors. This type of conveyor drive is desirable because it insures that the conveyor will run in synchronism with the press which may be run at various speeds depending upon various factors, such as, the number of papers to be made up in a particular production run, the number of units feeding the folder, operating conditions, etc. To insure that any finished papers remaining in the press folder and conveyor will be run-out following shut down of the press and press folder, an auxiliary driving motor is usually provided to drive the conveyor and the fly belts leading from the press folder alone.

As will be appreciated, a certain amount of driving power is required to drive an empty conveyor, the amount depending upon the length and complexity of the conveyor runs. During a production run of the press, the conveyor system will be loaded with papers throughout a greater portion of the run and such load requires additional driving power, such additional driving power varying in relation to the weight of the individual papers. Experience has shown that in operating such conveyors by power derived from a shaft of the press folder, such shaft should not be called upon to exert appreciably in excess of 650 pound-inches torque in affording drive of the fly belts of the press folder and the conveyor proper.

Because of the length and complexity of the conveyor system in certain installations and/or because of the usual weight of the individual papers to be handled, more driving power is required to operate the conveyor system than can be safely obtained through a shaft of the press folder. It has heretofore been proposed that a booster motor or motors be provided to help drive the conveyor under such conditions. In order to maintain synchronization of the conveyor speed with that of the press throughout the range of operating speeds of the latter, this has necessitated the use of rather complex control systems so that the booster motors are kept in step with the press operating speed.

A primary object of the present invention is to provide a novel form of drive system for conveyors employing one or more booster motors of such character that the problem of synchronizing the speed of such booster motors with the speed of the main conveyor drive is non-existent.

Another object is to provide a drive system of the aforementioned character which may be readily adapted to different conveyor layouts by mere addition or subtraction of the number of booster motors and motor starters therefor.

Other objects and advantages of the invention will hereinafter appear.

The accompanying drawings illustrate one preferred embodiment of the invention which will now be described in detail, it being understood that the embodiment illustrated is susceptible of various modifications in respect of its details without departing from the scope of the appended claims.

In the drawings,

Figure 1 is a schematic showing in side elevation of a newspaper conveyor system.

Fig. 2 is a schematic showing in side elevation of a drive mechanism for the conveyor system shown in Fig. 1.

Fig. 3 graphically depicts an operating characteristic of certain motors shown in Fig. 2, and Fig. 4 is a schematic and diagrammatic showing of a control system for the driving motors shown in Fig. 2.

Referring to Fig. 1, it shows a typical conveyor system for a newspaper printing plant which is coordinated with the printing press to effect delivery of the finished papers as they leave the press to a delivery table located at some point remote from the press itself, such as in a mail room. Generally considered, the conveyor system comprises the fly belts 10 of a press folder 11, a double belt type conveyor having interconnecting sections 13, 14, 15, 16, 17, 18 and 19 and a delivery table 20. Press folder 11 may be considered as part of a printing press (not shown) and together with such press is afforded drive by the alternating current electric motor 21 or alternatively by a similar motor 22, which motors have a clutch coupling 23 therebetween. It may be assumed that for plating and threading of the press prior to the start of the production run that the clutch 23 is engaged and that the motor 22, usually of small rating compared to the motor 21, is energized to afford drive of the press at low speeds through the motor 21 which is deenergized. Further, it may be assumed that during a production run the clutch 23 is disengaged and the motor 21 is energized to afford drive of the press, press folder 11, and through a drive mechanism to be hereinafter described, drive of fly belts 10 and all sections of the conveyor. In addition, a clearance motor 24 is provided to afford drive of the fly belts 10 and of the conveyor alone, following shut-down of the press and press folder 11 at the end of a production run, thus insuring that any papers remaining on the fly belts 10 and in the conveyor will be runout to the delivery table.

Conveyor section 13 terminates at one end within a press connection unit 25 and at its other end within a section joint 26 where it interconnects with one end of conveyor section 14. Conveyor section 14 terminates at its other end within a corner unit 27 where it interconnects at a right angle relation with one end of conveyor section 15. Conveyor section 15 at its other end terminates within a section joint 28 where it interconnects with one end of a conveyor section 16. The termination of conveyor section 16 at its other end is not shown, nor is the entering end of conveyor section 17 shown. It may be assumed that there may be other conveyor sections between conveyor sections 16 and 17, the number of such other conveyor sections depending upon the length of the horizontal traverse involved, and that such other conveyor sections interconnect with conveyor sections 16 and 17 within section joints like section joint 28. Conveyor section 17 terminates within a corner unit 29 where it interconnects at a right angle relation with conveyor section 18. Conveyor section 18 at its other end terminates within a section joint 30 where it interconnects with one end of conveyor section 19. Conveyor section 19 at its other end terminates at delivery table 20.

Press connection unit 25 may be considered to constitute a built-up supporting framework affording support of shafts 31 and 32 on which are mounted the end pulleys for the endless belts of conveyor section 13. Shaft 32 also has mounted thereon the drive pulleys for transfer belts 33 which form an interconnection between the fly belts 10 and the belts of conveyor section 13. Unit 25 also supports a shaft 34 on which are mounted end pulleys for fly belts 10, and, shafts 35 and 36 on which are mounted idler pulleys for transfer belts 33. As will be hereinafter explained, press connection unit 25 also affords support of certain parts of the drive mechanism.

Section joints 26, 28, 30 and corner units 27 and 29, may also be considered to constitute individual supporting frameworks affording support of shafts on which are mounted end pulleys for the belts of the interconnecting conveyor sections. More particularly, section joint 26 supports shafts 37 and 38 on which are mounted end pulleys for the belts of conveyor section 13 and end pulleys for the belts of conveyor 14. Corner unit 27 has mounted therein shafts 39 and 40 on which are supported end pulleys for the belts of conveyor section 14 and end pulleys for belts of conveyor section 15. Shaft 40 also has mounted thereon drive pulleys for corner belts 41. Corner unit 27 further supports shafts 42 and 43 on which are mounted idler pulleys for corner belts 41.

Section joint 28 supports shafts 44 and 45 on which are mounted end pulleys of the belts of conveyor section 15 and end pulleys of the belts of conveyor section 16.

Corner unit 29 supports shafts 46 and 47 on which are mounted end pulleys for belts of conveyor section 17 and end pulleys for belts of conveyor section 18. Shaft 47 also supports drive pulleys for corner belts 48. Corner unit 29 additionally supports shafts 49 and 50 on which are mounted idler pulleys for corner belts 48.

Section joint 30 supports shafts 51 and 52 on which are mounted end pulleys for the belts of conveyor section 18 and end pulleys for belts of conveyor section 19.

Delivery table 20 has associated therewith an end unit 53 which may be assumed to constitute a built-up framework affording support of shafts and certain parts of the conveyor drive mechanism. More particularly, end unit 53 supports shafts 54 and 55 on which are mounted end pulleys for the belts of conveyor section 19. Shaft 54 also has mounted thereon drive pulleys for transfer belts 56. End unit 53 additionally supports shafts 57 and 58 on which are mounted idler pulleys for transfer belts 56.

Shafts 37 and 38 of section joint 26, shafts 39 and 40 of corner unit 27, shafts 44 and 45 of section joint 28, shafts 46 and 47 of corner unit 29, shafts 51 and 52 of section joint 30 and shafts 54 and 55 of end unit 53 have drive interconnections therebetween as depicted by the broken lines 59, 60, 61, 62, 63 and 64. Such broken lines may be assumed to represent meshing gears of one to one ratio carried on the pairs of shafts which afford drive of the second mentioned shaft of each pair when the first mentioned shaft of each pair is driven as will be hereinafter explained in detail. Shaft 31 of press connection unit 25 has drive interconnections with shafts 32 and 34 as depicted by the broken lines 65 and 65ª which may be assumed to represent a gear carried on shaft 31, meshing with like gears carried on shafts 32 and 34, thereby enabling drive of shafts 32 and 34 by drive of shaft 31 in a one to one ratio.

Referring to Fig. 2, it shows the main driving mechanism for the conveyor system shown in Fig. 1. Driving power is transmitted from a sprocket 11ᵇ supported on a shaft 11ª in press folder 11 by means of an endless chain 66 which runs on sprocket 11ᵇ and on a sprocket 67 fixed to one element of an over-running clutch 68 carried on a shaft 69 which is supported by press connection unit 25. Clearance motor 24 is connected to one element of an over-running clutch 70 mounted in press connection unit 25 by means of a shaft 71. The other element of clutch 70 carries a sprocket 72 on which runs an endless chain 73. Chain 73 also runs on a sprocket 74 fixed on shaft 31. Drive interconnection between shafts 31 and 69 is afforded by means of an endless chain 75 running on sprockets fixed on said shafts.

The drive mechanism thus far described is such that shaft 31 may be driven by power derived from the shaft 11ª of press folder 11 or alternatively by clearance motor 24. When the press is in operation, chain 66 runs in the direction shown and clutch 68 is thus engaged affording drive of shaft 69 in the clockwise direction. Chain 75 is thus caused to run clockwise to drive shaft 31 in the same direction. Drive of shaft 31 in the clockwise direction causes chain 73 to run in the same direction, but clutch 70 over-runs when motor 24 is idle, thus preventing drive of the latter. When the press is idle and clearance motor 24 is running, the drive is through shaft 71 to clutch 70. Under this condition, clutch 70 is engaged to drive sprocket 72 clockwise. Chain 73 transmits driving power to shaft 31 to drive it in the clockwise direction. Due to the drive of shaft 31, chain 75 drives shaft 69 in the same direction, but chain 66 remains idle due to the fact that clutch 68 under such conditions is over-running.

An endless chain 78 running on a sprocket 77 fixed to shaft 37 of section joint 26 on a sprocket fixed to shaft 31, affords drive of shaft 37. An endless chain 78 running on a sprocket 79 fixed to shaft 39 of corner unit 27 and on another sprocket fixed to shaft 37 of section joint 26 affords drive of shaft 39. Driving power is transmitted to shaft 44 of section joint 28 by means of an endless chain 80 running on sprockets fixed to shafts 39 and 44. Driving power is transmitted from shaft 44 to the next succeeding section joint (not shown) by means of an endless chain 81 running on a sprocket fixed on shaft 44 and on a sprocket fixed on a shaft of such succeeding section joint. Shaft 46 of corner unit 29 is driven by an endless chain 82 running on a sprocket 83 fixed to shaft 46 and on a sprocket fixed on a shaft preceding section joint (not shown). Driving power is transmitted to shaft 51 of section joint 30 by means of an endless chain 84 running on sprockets fixed on shafts 46 and 51. Shaft 54 of end unit 53 is driven by means of an endless chain 85 running on a sprocket 86 fixed to shaft 54 and on a sprocket fixed to shaft 51.

The drive thus far described is a conventional type of drive commonly used for driving newspaper conveyors. It will be seen that whenever shaft 31 is driven, which is always in the clockwise direction, that shafts 37, 39, 44, 46, 51 and 54 will be thus driven in the same direction through the medium of the chain and sprocket driving connections hereinbefore described. Shaft 31 through its geared connections with shafts 32 and 34 of press connection unit 25, will afford drive of such shafts in the anti-clockwise direction. As aforeindicated, each of the shafts 37, 39, 44, 46 and 51 have one to one ratio geared driving connections with the shafts 38, 40, 45, 47, 52 and 55, respectively, and thus afford drive of the last mentioned shafts in the anti-clockwise direction.

The driving mechanism of the present conveyor system, besides being afforded drive from any one of the motors 21, 22 or 24, is provided with booster driving motors 87 and 88 as shown in Figs. 1 and 2. Motor 87 is provided with a shaft 87ª on which is fixed a sprocket 89. An endless chain 90 running on sprocket 89 and on a sprocket 91 fixed to shaft 44 of section joint 28 affords transmission of driving power from motor 87 to shaft 44. Motor 88 is provided with a shaft 88ª on which is fixed a sprocket 92. An endless chain 93 running on sprocket 92 and on a sprocket 94 fixed to shaft 51 of section joint 30, affords transmission of driving power from motor 88 to shaft 51.

It is required that each of the motors 87 and 88 be a three-phase alternating current motor of the so-called "torque motor" type. Generally considered the term "torque motor" indicates a three-phase alternating current motor which develops maximum torque at standstill and which is capable of applying stalled torque and operating at speeds considerably below synchronous speed for relatively long periods of time without overheating or incurring injury. The torque motor is usually designed in these respects to meet operating requirements.

As such "torque motors" are available in a wide variety of ratings, the selection of a desired size for such motors to meet the service conditions which motors 87 and 88 are called upon to meet is important. Whereas the present conveyor system is shown as having two booster motors 87 and 88, it will be appreciated that the torque driving requirements in conveyor systems will vary considerably and in certain cases one such booster motor of proper rating will suffice wherein other cases more than two booster motors will be required. The selection of the rating and number of such "torque motors" needed to afford booster motor drive in any conveyor installation should take into account the following:

(1) The torques required to drive the conveyor in empty condition and in extreme loaded condition.

(2) The use of booster motors is desirable when the driving torque load on the press folder shaft, in extreme loaded condition of the conveyor, appreciably exceeds 650 pound-inches.

(3) Maximum torque output exerted by the booster motors, collectively, must be less than the driving torque required to drive the conveyor in empty condition.

(4) Torque output of such booster motors should not vary greatly over the range of conveyor operating speeds.

As the main drive of a newspaper conveyor during production operation of the printing press is derived from the press motors, the speed of the conveyor will depend upon the speed of the press. Usually the pulley shafts of the conveyor will run at speeds within a range of 0 to 160 R. P. M. Consequently, selection of a torque motor developing approximately 100 pound-inches torque at 80 R. P. M. has been found to be a good choice where it is desired to standardize on a single size motor, which is adaptable to a wide variety of conveyor installations. Fig. 3 shows a curve A depicting the speed-torque characteristics of a commercially available torque motor which has been found to be a particularly suitable selection for the booster motor service herein contemplated.

The location of such booster motors in the conveyor system is, to a certain extent, a matter of choice. In newspaper conveyors the driving connections of such motors can most readily be made with shafts of section joints. The ideal location and spacing of such motors can be determined from a consideration of the gradient of the torque required to drive the conveyor from the press connection end to the delivery table end under extreme loaded condition of the conveyor.

It is required that booster motors 87 and 88 both be energized whenever one of the motors 21, 22 or 24 is energized. Fig. 4 shows a control system whereby energization of motors 87 and 88 is insured whenever one of the motors 21, 22 or 24 is energized. More particularly, motor 87 is provided with an electromagnetic contactor 95 for effecting connection of the same to supply lines $L^1$, $L^2$ and $L^3$ of a three-phase alternating current supply source. Similarly motor 88 is provided with an electromagnetic contactor 96 for effecting its connection to supply lines $L^1$, $L^2$ and $L^3$. Contactors 95 and 96 are provided with energizing windings 95ª and 96ª, respectively, which are energized whenever one of the motors 21, 22 or 24 is energized. Windings 95ª and 96ª are each connected at corresponding ends to line $L^3$ and their other ends are connected together to line $L^2$, alternatively, through auxiliary contacts 97ᵇ of an electromagnetic contactor 97 associated with motor 24, through contacts 98ᵇ of an electromagnetic relay 98 associated with motor 21, or through contacts 99ᵇ of an electromagnetic relay 99 associated with motor 22.

Motor 21 is provided with an electromagnetic contactor 100 for effecting its connection to supply lines L¹, L² and L³ and motor 22 is provided with an electromagnetic contactor 101 for effecting its connection to lines L¹, L² and L³. Contactor 100 is provided with an energizing winding 100ª whose energization is controlled by start and stop buttons 102, and 103, respectively. Further, contactor 100 is provided with auxiliary contacts 100ᵇ for effecting a holding circuit connection for winding 100ª and auxiliary contacts 100ᶜ for controlling energization of an energizing winding 98ª of relay 98. Contactor 101 is provided with an energizing winding 101ª whose energization is controlled by start and stop buttons 104 and 105, respectively. Further, contactor 101 is provided with auxiliary contacts 101ᵇ for effecting a holding circuit connection for winding 101ª and auxiliary contacts 101ᶜ for controlling the energization of an energizing winding 99ª of relay 99.

Contactor 97 is provided with an energizing winding 97ª whose energization is controlled by start and stop buttons 106 and 107, respectively. Further, contactor 97 is provided with auxiliary contacts 97ᶜ for effecting a holding circuit connection for winding 97ª.

It will be apparent that whenever one of the motors 21, 22 or 24 is energized by connection to lines L¹, L² and L³, through operation of its respective associated electromagnetic contactor, the windings 95ª and 96ª of contactors 95 and 96 will then be energized and such contactors will therefore effect connection of motors 87 and 88 to lines L¹, L² and L³, thereby insuring that the latter motors will run whenever one of the motors 21, 22 or 24 are running.

If the booster motors 87 and 88 are properly selected with respect to torque output and the driving torque requirements of the conveyor system, these motors will then afford driving torque supplementing the driving torque afforded by the main driving motor and will run at a speed dictated by the speed of the main driving motor. In other words, these motors will be self-synchronizing in respect of speed and it is therefore unnecessary to provide speed synchronizing control. To insure such self-synchronization with respect to speed of booster motors 87 and 88, the maximum torque output of these motors, collectively, must be less than the torque required to drive the conveyor in empty condition.

As will be appreciated, the use of booster motors 87 and 88 to afford supplemental driving torque, reduces the torque transmission load on press folder shaft 11ª, the driving connections between shaft 11ª and shaft 31 of the conveyor, shafts 31, 37 and 39 of the conveyor, and at the same time tends to equalize the torque transmission load on all shafts of the conveyor proper.

Referring to Fig. 2, spring biased idler rollers 108 and 109 are provided for the endless chains 80 and 84, respectively, to regulate the slack in these chains. When the conveyor is started from rest, booster motors 87 and 88 will be energized concurrently with whichever main driving motor is selected for driving the conveyor. Consequently, motors 87 and 88 will pick up the drive of shafts 44 and 51 before the effect of the drive of the main driving motor is transmitted thereto. Thus for a short interval, chains 80 and 84 will respectively be tight on the sides opposite the idler rollers 108 and 109, and will be slack on the sides adjacent these idler rollers. When the effect of the main driving motor reaches these chains, a reversal takes place in the tight and slack sides of chains 80 and 84 with the sides adjacent idler rollers 108 and 109 then becoming tight and the sides opposite becoming slack. The idler rollers 108 and 109 suppress the tendency of chains 80 and 84 to whip during the sudden reversal in their tight and slack sides which, if uncontrolled, might cause such chains to jump their end sprockets or cause them to break. Preferably, spring biased idler rollers or sprockets should be used in conjunction with each of the main driving chains immediately to the press connection side of each booster motor.

While the drive system herein shown and described is particularly advantageous for use in connection with newspaper conveyors, it will be apparent to those skilled in the art that such drive system is not limited to use with conveyors of this type but can be adapted for use in connection with conveyors of other types.

I claim:

1. The combination with a conveyor which when driven affords transport of materials in a continuous manner from one point to another, a drive mechanism for said conveyor comprising a plurality of shafts in a spaced apart relation along the traverse of said conveyor to afford drive of said conveyor at a plurality of points and means interconnecting said shafts for transmitting driving power therebetween in train, a prime mover, and driving connections between said prime mover and said drive mechanism, said prime mover when energized supplying said drive mechanism with driving power, of an alternating current torque motor, driving connections between said torque motor and a shaft of said drive mechanism, said torque motor having speed-torque characteristics such that it is incapable of driving said conveyor alone under any conditions, but rendering it self-synchronizing as to speed so that when energized it inherently supplies supplemental driving torque to said drive mechanism at the same speed as that afforded the latter by said prime mover, and means affording supply of electrical power to said torque motor whenever said prime mover is supplying driving power to said drive mechanism.

2. The combination with a conveyor which when driven affords transport of materials in a continuous manner from one point to another, a drive mechanism for said conveyor comprising a plurality of shafts in a spaced apart relation along the traverse of said conveyor to afford drive of said conveyor at a plurality of points and means interconnecting said shafts for transmitting driving power therebetween in train, a prime mover, and driving connections between said prime mover and said drive mechanism, said prime mover when energized supplying said drive mechanism with driving power, of an alternating current torque motor, driving connections between said torque motor and a shaft of said drive mechanism, said torque motor having speed-torque characteristics such that it is incapable of driving said conveyor alone under any conditions, but rendering it self-synchronizing as to speed so that when energized it inherently supplies supplemental driving torque to said drive mechanism at the same speed as that afforded the latter by said prime mover to thereby reduce the torque transmission load on the first mentioned driving connections and all shafts of said drive mechanism lying between said first mentioned driving connections and the shaft with which said torque motor has connection, and means affording supply of electrical power to said torque motor whenever said prime mover is supplying driving power to said drive mechanism.

3. The combination with a conveyor which when driven affords transport of materials in a continuous manner from one point to another, a drive mechanism for said conveyor comprising a plurality of shafts in a spaced apart relation along the traverse length of said conveyor to afford drive of the latter at a plurality of points and means interconnecting said shafts for transmission of driving power therebetween in train, an electric motor, and driving connections between said motor and one shaft of said drive mechanism, said motor when energized supplying driving power to said drive mechanism, of an alternating current torque motor, driving connections between said torque motor and another shaft of said drive mechanism, said torque motor having speed-torque characteristics such that it is incapable of driving said conveyor alone under any conditions, but rendering it self-synchronizing as to speed so that when energized it inherently supplies supplemental driving torque to said drive mechanism at the same speed as that afforded the latter by the first mentioned electric motor to thereby reduce the torque transmission load on the first mentioned driving connections, said one shaft and such of the other shafts of said drive mechanism as lie between said one and said other shaft, and means affording supply of electrical power to said torque motor whenever said first mentioned motor is supplying driving power to said drive mechanism.

4. In combination, a conveyor which when driven affords transport of materials in a continuous manner from one point to another, a drive mechanism for said conveyor comprising a plurality of shafts in spaced apart relation along the traverse of said conveyor to afford drive of the latter at a plurality of points, sprockets fixed on said shafts, and endless chains running between adjacent shafts on said sprockets, an electric motor, driving connections between said motor and one shaft of said drive mechanism, said motor when energized supplying driving power to said drive mechanism, an alternating current torque motor, driving connections between said torque motor and another shaft of said drive mechanism, said torque motor having speed-torque characteristics such that it is incapable of driving said conveyor alone under any conditions, but rendering it self-synchronizing as to speed so that when energized it inherently supplies supplemental driving torque to said drive mechanism at the same speed as that afforded the latter by the first mentioned electric motor to thereby reduce the torque transmission load on the first mentioned driving connection and all shafts of said drive mechanism lying between said first mentioned driving connections and said other shaft, and means affording supply of electrical power to said torque motor whenever said first mentioned electric motor is supplying driving power to said drive mechanism.

5. In combination, a conveyor which when driven affords transport of materials in a continuous manner from one point to another, a drive mechanism for said conveyor comprising a plurality of shafts in spaced apart relation along the traverse of said conveyor to afford drive of the latter at a plurality of points, sprockets fixed on said shafts, and endless chains running between adjacent shafts on said sprockets, an electric motor, driving connections between said motor and one shaft of said drive mechanism, said motor when energized supplying driving power to said drive mechanism, an alternating current torque motor, driving connections between said torque motor and another shaft of said drive mechanism, said torque motor having speed-torque characteristics such that it is incapable of driving said conveyor alone under any conditions, but rendering it self-synchronizing as to speed so that when energized it inherently supplies supplemental driving torque to said drive mechanism at the same speed as that afforded the latter by said first mentioned electric motor to thereby reduce the torque transmission load on the first mentioned driving connections and all shafts of the drive mechanism between said first mentioned driving connections and said other shaft, means affording supply of electrical power to said torque motor whenever said first mentioned electric motor is supplying driving power to said drive mechanism, and a spring biased idler sprocket engaging the endless chain running between said other shaft and the shaft lying immediately to the side toward said first mentioned driving connections for damping the effect of shock forces occurring in such chain as an incident to reversals in tight and slack sides thereof.

6. The combination with a conveyor which when driven affords transport of materials in a continuous manner from one point to another, a drive mechanism for said conveyor comprising a plurality of shafts in a spaced apart relation along the traverse length of said conveyor to afford drive of the latter at a plurality of points and means interconnecting said shafts for transmission of driving power therebetween in train, an electric motor, and driving connections between said motor and one shaft of said drive mechanism, said motor when energized supplying driving power to said drive mechanism, of a plurality of alternating current torque motors individualized respectively to other shafts of said drive mechanism, driving connections between each of said torque motors and their respective associated shafts, said torque motors each having speed-torque characteristics such that they are incapable, individually or collectively, of driving said conveyor alone under any conditions, but rendering each self-synchronizing as to speed so that when energized they each inherently supply supplemental driving torque to said drive mechanism at the same speed as that afforded the latter by the first mentioned motor, and means affording supply of electrical power to said torque motors whenever said first mentioned motor is supplying driving power to said drive mechanism.

THEODORE B. JOCHEM.

References Cited in the file of this patent
UNITED STATES PATENTS

| Number | Name | Date |
| --- | --- | --- |
| 1,888,309 | Cramer | Nov. 22, 1932 |
| 2,215,647 | Lightfoot | Sept. 24, 1940 |
| 2,428,567 | Harris et al. | Oct. 7, 1947 |